Sept. 12, 1967  R. N. ARMSTRONG ETAL  3,340,726
DYNAMIC FORCE MEASUREMENT INSTRUMENT
Filed Jan. 29, 1965
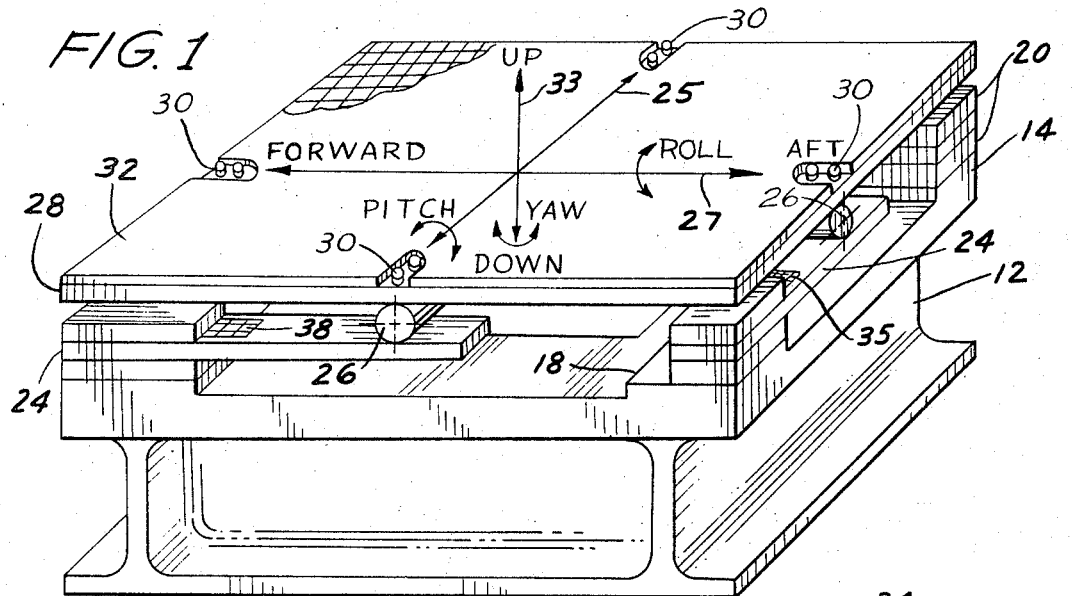
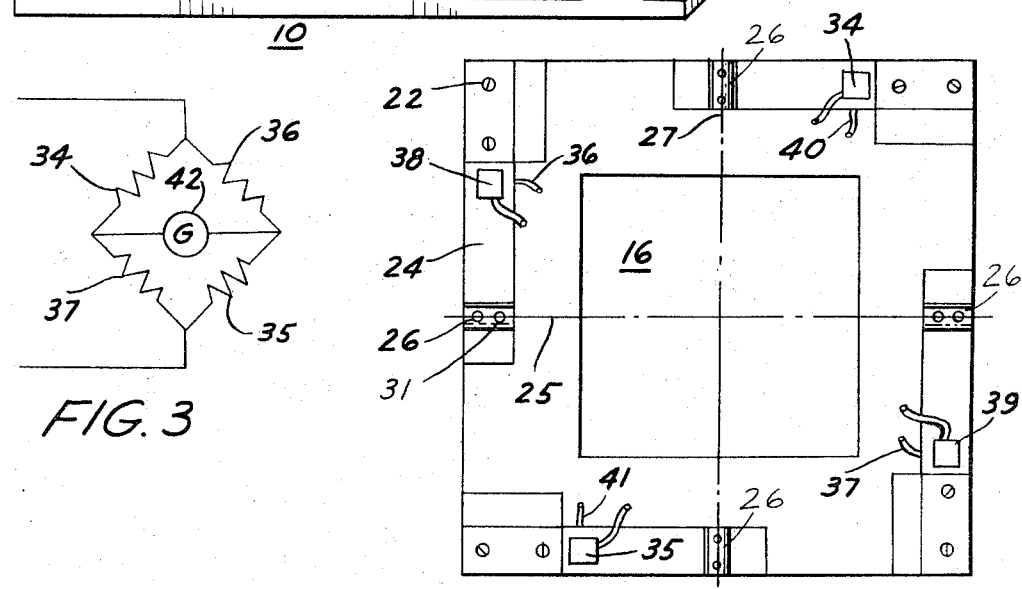
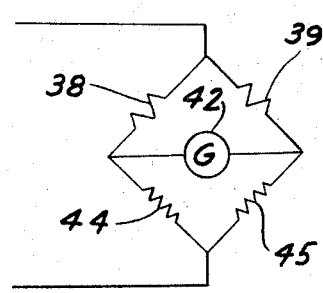
RAYMOND N. ARMSTRONG
FRED PRADKO
CHESTER T. KEDZIOR
RICHARD A. LEE
INVENTORS
BY H. M. Saragovitz,
E. J. Kelly,
H. Berl,
E. P. Barthel
ATTORNEYS United States Patent Office 3,340,726
Patented Sept. 12, 1967

3,340,726
DYNAMIC FORCE MEASUREMENT
INSTRUMENT
Raymond N. Armstrong, Detroit, Chester T. Kedzior and Richard A. Lee, Warren, and Fred Pradko, East Detroit, Mich., assignors to the United States of America as represented by the Secretary of the Army
Filed Jan. 29, 1965, Ser. No. 429,177
4 Claims. (Cl. 73—67)

The invention described herein may be manufactured and used by or for the Government for governmental purposes without the payment of any royalty thereon.

The present invention relates to a dynamic force measurement instrument and more particularly to a dynamic force measurement instrument to identify and relate human body response to vehicle vibration.

A test apparatus to effectively measure and determine human vibration response does not exist at the present time in any usable form. It is customary to speak of specific vibration as being comfortable, severe, intolerable or unpleasant. To different people, this may mean the same or a different reaction of the senses. Much of today's vehicle vibration research is performed using the conventional "jury rating" method. This procedure requires a group of practical experts to assign numbers to their subjective impressions. Thus, an average of these numerical impressions is considered a classification of the vibration environment. The alternative of the "jury" procedure is a direct measurement of some variable which characterizes vibration. This direct measurement approach has eluded all known investigations to date because of the fact that the human body is not a relatively homogeneous mass.

The present invention was designed to record the dynamic force or weight change of human test subjects in a seated posture. The instrument measures dynamic force directly in pounds by means of the application of transducers to a series of cantilevered beams arranged in a unique position to support a top plate. Force is applied to the cantilevers from the top plate through the use of small support cylinders which act as axial knife edge contacts between the plate and the cantilevers. The subject to be tested is seated on the plate and undergoes vibration while data is detected by vibration-transducer devices and the modulated output signals are transmitted by electrical circuit means to a recording unit where such information is stored in retrievable form.

An object of the present invention is the provision of a device for measuring the dynamic force or weight change of human test subjects.

Another object is to provide a cantilevered support structure for measuring vibration by means of transducers to relate whole-body human response to vehicle vibration.

A further object of the invention is the provision of a dynamic force measurement instrument which is equally effective for testing all significant vibration modes including pitch, roll and vertical or any combination thereof.

Other objectives and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 shows a perspective view of a platform embodying the invention.

FIG. 2 is a plan view of the instrument of FIG. 1 with the top plate removed.

FIGS. 3 and 4 are schematic diagrams of representative bridge circuits utilized.

Referring now to the drawings, there is shown in FIG. 1, which illustrates a preferred embodiment, a dynamic force measurement instrument 10 designed so that its support structure 12 can be secured to a four-degree-of-freedom type testing machine vibrator (not shown). The instrument 10 which is made of metal has a square shaped main support plate 14 provided with a center access hole 16 and raised milled corner portions 18. A pair of spacer blocks 20 are located on each of the raised corners to provide a sandwich type support, secured by screws 22, for the fixed ends of two pair of flexible cantilevered beams 24. It will be noted that all four beams 24 lie in a common horizontal plane.

It will be noted in FIG. 2 that the four uniformly constructed beams 24 are symmetrically positioned in a common horizontal plane to extend along the sides of the square plate 14 centered on the axes 25 and 27. These axes, together with a vertical axis 33 form a rectangular Cartesian coordinate system. The unsupported end of each of the beams 24 extends an equal distance beyond one of the axes 25 or 27 to support the cylinders 26. The principal axes of the cylinders are vertically coplanar with one or the other of the coordinate axes so that plate 28 is spaced from and coincident with plate 14 while being supported for movement relative to members 12 and 14 on the roller surfaces of the four cylinders 26. To secure the top plate 28 in fixed relation to the cylinders 26, a pair of bolts 30 are inserted through corresponding openings 31 in each cylinder and bolted to the underside of its associated beam. A cover layer of cork or other suitable resilient material 32 is secured to the upper surface of top plate 28 to provide a cushioned seating surface.

In addition, the test instrument arrangement of FIG. 1 includes the vibration-transducer devices referenced by the numerals 34 through 41. Such devices may take the form of strain gages, crystal pick-ups, or semiconductor strain gages, but they are illustrated in the form of conventional state-of-the-art strain gages made of wire or foil. The operation of the test instrument is dependent upon the strain gage arrangement to measure in three basic motions, vertical, roll and pitch.

Eight strain gages are mounted on the surface of the beams 24 as shown in the drawings, four for vertical movement and two each for roll and pitch indication. Each cantilever beam has two strain gages symmetrically mounted near its supporting blocks 20 in order to record the greatest bending moment. The strain gages located on top surface of the beams can be seen in FIG. 2 while those underneath are not shown except as indicated by a partial showing of their lead wires.

The strain gages 34 through 37 form the four legs of a bridge circuit shown schematicallly in FIG. 3 to measure vertical movement. Under no force or motion, the bridge is balanced. For a downward movement of the seat along the vertical axis 33 shown in FIG. 1, a force is exerted down on the cantilevers causing the resistance of strain gages 34 and 35 to increase, and the resistance of 36 and 37 to decrease. This upsets the initial balance of the bridge; and the deflection of the galvanometer 42, or other suitable indicating device, is an indication of the degree of unbalance. Since the bridge unbalance is proportional to the force on the seat, the galvanometer indication is a direct measure of the force on the seat.

The strain gages 38 and 39 form two legs of a bridge circuit with the other two legs comprised of fixed resistors 44 and 45 as seen in FIG. 4. With no motion, no force is exerted on either strain gage 38 or 39 and the bridge is balanced. With a vertical motion but no rolling motion, an equal force is exerted on 38 and 39 producing an equal change in resistance which does not destroy the bridge balance. Under roll conditions about the roll axis, a force pushes on either 38 or 39 causing an increase or decrease in the resistance of 38 or 39, unbalancing the bridge. It will be noted that the origin of the axes 25, 27 and 33 is essentially positioned in the horizontal plane passing through the principal axis of all four cylinders 26.

The identical action occurs for pitch as for roll with the exception that strain gages 40 and 41 are located on the underside of the beams attached to the strain gages 34 and 35. The strain gages 40 and 41 form two legs of a third bridge circuit (not shown). The other two legs are comprised of fixed resistors in the same manner as the bridge circuit shown in FIG. 4 for measuring pitch motion. The signal from the bridge circuits can be fed through an amplifier into a direct-writing oscillograph (not shown) or other data reduction equipment arrangement which may be utilized in connection with the force measurement instrument.

Obviously many modifications and variations of the present invention are possible in the light of the above teachings. It is therefore to be understood that within the scope of the appended claims, the invention may be practiced otherwise than as specifically described.

We claim:
1. Test apparatus for use with a four-degree-of-freedom type testing machine vibrator to measure pitch, roll and vertical movement about a rectangular Cartesian coordinate axis system, and comprising:
   a base member adapted to be supported on the testing machine,
   a horizontal plate member mounted on said base member for movement with respect thereto,
   two pair of flexible cantilever beams having their fixed ends secured to said base member for movement toward and away from said base member,
   support members rigidly attached to said beams and said plate member providing line-contact fulcrums between said plate and said beams,
   each pair of said beams being parallel respectively to one of the horizontal axes of the coordinate system,
   said beams arranged in a common horizontal plane while being symmetrically arranged about the origin of the coordinate system whereby the fixed ends of each of said beams are equidistant from the origin,
   and transducer means secured to each of said beams for measuring the pitch, roll and vertical movement of said plate member.

2. The test apparatus defined in claim 1, wherein said support members are in the form of cylinders whose principal axes lie respectively in one of the two vertical planes formed by the axis system.

3. The test apparatus defined in claim 1, wherein said transducer means are secured on either side of said beams near said fixed ends to measure the maximum bending moment.

4. The test apparatus defined in claim 1, wherein said transducer means are in the form of strain gages that form the legs of a bridge circuit whereby a direct measure of forces on said plate member is obtained.

References Cited
UNITED STATES PATENTS
| | | | |
|---|---|---|---|
| 2,359,245 | 9/1944 | Ritzmann | 73—71.2 |
| 2,890,584 | 6/1959 | Dickie | 73—71.6 |
| 2,953,091 | 9/1960 | Rosenberg | 73—116 |

OTHER REFERENCES
Hermann, German application L 21,608, printed August 1956, Kl 42 k 011, 3 pp. spec., 1 sht. dwg.

JAMES J. GILL, *Primary Examiner.*

JOHN P. BEAUCHAMP, *Assistant Examiner.*